Sept. 20, 1932.    K. HÄHNEL    1,877,857
ABSORPTION MACHINE
Filed July 9, 1929
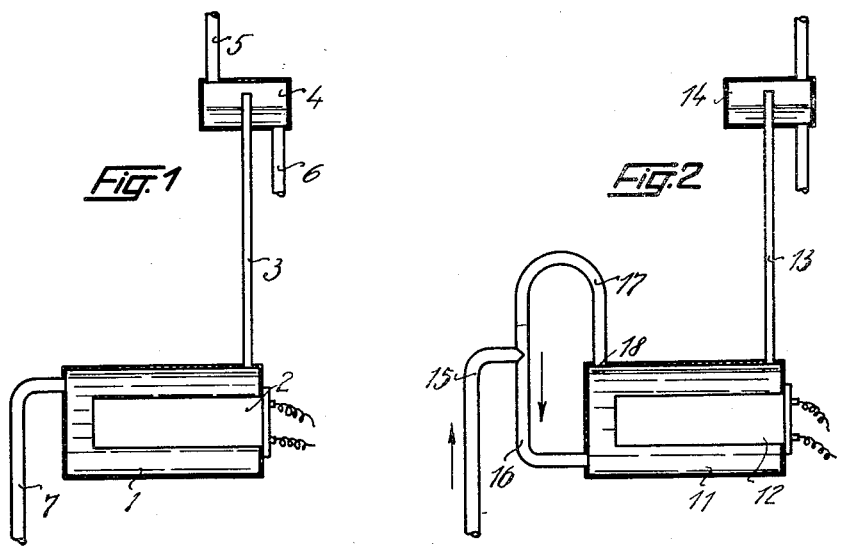
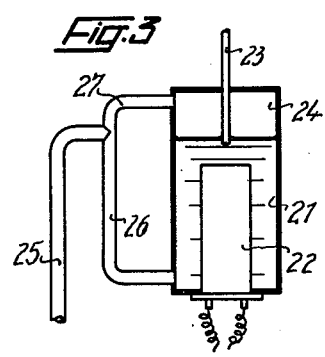
Inventor
Kurt Hähnel
By Singer & Bro.
Attys.

Patented Sept. 20, 1932

1,877,857

UNITED STATES PATENT OFFICE

KURT HÄHNEL, OF FALKENSEE, NEAR SPANDAU, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

ABSORPTION MACHINE

Application filed July 9, 1929, Serial No. 377,028, and in Germany July 20, 1928.

My invention relates to improvements in absorption machines, and more particularly to boilers for continuously operating absorption machines, in particular of the type disclosed in the U. S. patents to Altenkirch Nos. 1,615,353 and 1,728,742.

There are known boilers, stills or evaporators for continuously operating absorption machines in which a vessel or container, in which gas bubbles are developed by the application of heat from an absorption solution introduced from below, communicates by a pipe in which the absorption solution ascends together with the gas bubbles, with a chamber in which the gas bubbles and the absorption solution separate from each other. The first-named container is frequently designed as coiled pipe. Since the rising pipe leading to the gas separating chamber must possess a comparatively narrow cross-section in view of the conveyance of the liquid by gas bubbles it may happen that it becomes choked up by sludge. The tubular boiler is therefore sometimes replaced by a pot or boiler-shaped vessel or container in which the sludge may settle at the bottom. Even in such boilers it may, however, happen that by excessively violent development of bubbles a temporary pressure substantially above the pressure at which the liquid is supplied to the boiler, develops in the boiler which causes a disturbance of the uniform flow of the liquid. This excessive pressure would displace the liquid from the boiler into the supply pipe. The heating surface not covered by liquid becomes overheated, so that when the absorption solution returns a turbulent gas development sets in which again causes a displacement of the liquid, a longer continued hindrance of the inflow of liquid and thus a breakdown of the apparatus.

The object of my invention is to produce a boiler for absorption machines in which the above recited drawback is effectively eliminated and permanent reliable operation ensured. This end in view is attained by arranging the supply pipe for the absorption solution to the preferably pot-shaped container or vessel in which the development of the gas bubbles takes place, in such a manner that even in case of temporary excess pressure in this vessel the space containing the heating surface is always filled with absorption solution to such a height that the heating surface is covered by liquid.

In the accompanying drawing I have illustrated three different modifications of a practical embodiment of my invention, all three figures representing longitudinal vertical sections through the vessels immediately concerned in the operation.

The supply pipe for the strong absorption solution may, for instance, open into the vessel in which the gas bubbles are to be developed above the heating surface. In case of any excess pressure gas might then enter the solution supply pipe and force its contents of liquid back, but a sufficient quantity of liquid would remain in the vessel so that its heating surface would permanently be covered with liquid. Such an embodiment is illustrated in Fig. 1 of the drawing.

Referring to this figure, 1 is a horizontally disposed cylindrical vessel the liquid space of which is filled with a solution of ammonia and water and to which the evaporation heat is supplied by an electric heating cartridge 2 located in its interior. From the top of the vessel 1 issues a rising pipe 3 through which the absorption solution mixed with gas bubbles passes into the gas separating chamber or rectifier 4. From this gas chamber the separated gas is conducted upward by a pipe 5 and the weak absorption solution downward by a pipe 6. The strong absorption solution is supplied to the boiler 1 by a pipe 7 which opens into the boiler 1 just above the upper edge of the electric heating element.

If a pressure above atmospheric develops in the vessel 1 this pressure extends into the supply pipe 7. However, no appreciable amount of the liquid contained in vessel 1 can be forced out of the vessel on account of the aforedescribed location of pipe 7, so that the heating surface of cartridge 2 remains permanently covered with liquid.

Another embodiment of my invention is illustrated in Fig. 2 of the drawing.

Referring to this figure, 11 is the vessel in which the gas is generated and which contains a heating cartridge 12, and 13 is the riser leading into the gas separator or rectifier 14. The supply pipe 15 for the strong absorption solution bifurcates prior to its entry into the vessel 11. One branch 16 extends first downwardly and opens at a lower point, a little above the bottom, into the vessel 11. The other branch 17 first rises and is then bent downward and opens into the upper portion of the vessel 11. By the last described arrangement the result is obtained that, in case an excess pressure develops in the vessel 11, which otherwise might force liquid back into pipe 16, such a pressure becomes equalized by the branch pipe 17 so that the level of the liquid in the vessel 11 remains unaltered. By introducing the absorption solution at a lower inlet point the further advantage is obtained that the layers of liquid which have become heavier by the expulsion of ammonia and have sunk down to the bottom mix again and again with liquid strong in ammonia and thus lighter. It is thus effectively avoided that within the liquid considerable temperature and concentration differences develop, and in this way the possibility is eliminated that a portion of the ammonia becomes decomposed into its constituents due to excessive concentration changes, and the temperature rises and partial pressure reductions connected therewith.

By raising the branch pipe 17 prior to its opening into the top of the vessel 11 above the branching point from pipe 15, care is taken that in the ascending leg of the branch 17 the liquid is able to ascend to such an extent that the column of liquid corresponds with the difference of the specific weights between the arriving strong liquid and the liquid in the vessel 11 partly weakened by the expulsion of ammonia.

In the embodiment of my invention illustrated in Fig. 3 of the drawing the vessel 21 in which the gas bubbles are developed, as well as the heating device 22 accommodated in its liquid space are arranged vertically. The riser 23 leading into the gas separating chamber projects into the top portion of vessel 21 where it terminates below the level of the liquid so that above the level a vapor space 24 is formed which does not interfere with the conveyance of the liquid in pipe 23. The supply pipe 25 for the strong solution branches into two parts at the height of the liquid level mentioned. Branch 26 leads downward and opens into the lower part of the vessel 21, while branch 27 is in communication with the vapor space 24.

The mode of operation of the last described modification is substantially identical with that described with reference to the apparatus illustrated in Fig. 2 and calls for no further explanations.

It will be understood that my invention is by no means confined to boilers, stills, generators or evaporators heated by an electric cartridge or other similar heating device, and that the heat necessary for expelling the gas might equally well be supplied by a steam jacket, steam pipes located in the interior, or gas burners below the vessel. The salient feature of my invention is that in all cases the liquid supply pipe is so located that the heating surface remains covered by the absorption liquid also if a temporary excess of pressure develops in the boiler.

I claim as my invention:

1. A combined boiler and gas lift pump comprising a main vessel, conduit means including a pipe disposed at a predetermined level with respect to said vessel and connected to both the upper and lower portions thereof for supplying liquid to said vessel and for maintaining at least a certain level of liquid therein, a vertically disposed outlet conduit of small diameter connected to the upper end of said vessel, and heating means associated with said vessel whereby gas may be evenly generated without violent surges in the liquid supplied to the vessel through said pipe by the application of heat to the vessel and act to pump liquid out of the vessel through said outlet conduit.

2. A combined boiler and gas lift pump for continuously operating absorption apparatus comprising in combination, a vessel for developing gas bubbles from an absorption solution by the application of heat, a heating surface in said vessel for transferring the heat applied to the surface to the absorption solution contained in the vessel, a gas separator located above said vessel and a pipe for raising the absorption solution together with the ascending gas bubbles developed in said vessel into said separator, a pipe for supplying strong absorption solution to said vessel, and having two branches, one branch terminating in said vessel above the top level of said heating surface, the other branch terminating in said vessel near its bottom, the dividing point of said branches from said supply pipe being located at a level not lower than the top level of said heating surface, to maintain the liquid level in the vessel above the heating surface even in case of a temporary excess pressure in said vessel.

3. A combined boiler and gas lift pump for continuously operating absorption apparatus comprising in combination, a vessel for developing gas bubbles from an absorption solution by the application of heat, a heating surface in said vessel for transferring the heat applied to the surface to the absorption solution contained in the vessel, a gas separator located above said vessel and a pipe for raising the absorption solution together with the ascending gas bubbles developed in said vessel into said separator, a pipe for supplying strong absorption solution to said vessel, and having two branches, one branch terminating in said vessel above the top level of said heating surface, and having an inverted U-shape extending above the entrance point of the branch into the vessel, the other branch terminating in said vessel near its bottom, the dividing point of said branches from said supply pipe being located at a level not lower than the top level of said heating surface, to maintain the liquid level in the vessel above the heating surface even in case of a temporary excess pressure in said vessel.

In testimony whereof I affix my signature.

KURT HÄHNEL.